United States Patent

Kikuchi et al.

[11] Patent Number: 5,133,232
[45] Date of Patent: Jul. 28, 1992

[54] CONTROL SYSTEM FOR CONTINUOUSLY OPERATING TRANSMISSION ACCORDING TO REQUIRED ACCELERATION

[75] Inventors: Toshiyuki Kikuchi, Higashi-Hiroshima; Mitsutoshi Abe; Hiroyuki Takebayashi, both of Hiroshima; Kenji Okamoto, Higashi-Hiroshima, all of Japan

[73] Assignee: Mazda Motor Corporation, Hiroshima, Japan

[21] Appl. No.: 664,843

[22] Filed: Mar. 5, 1991

[30] Foreign Application Priority Data

Mar. 8, 1990 [JP] Japan .................................. 2-57466
Feb. 7, 1991 [JP] Japan .................................. 3-16649

[51] Int. Cl.$^5$ .................................................. B60K 41/18
[52] U.S. Cl. .................................... 74/890; 74/866; 192/0.075; 192/3.3; 192/3.29
[58] Field of Search .............. 74/890, 866; 192/3.3, 192/3.29, 0.075

[56] References Cited

U.S. PATENT DOCUMENTS

| | | | |
|---|---|---|---|
| 4,367,812 | 1/1983 | Kobayashi et al. | 192/3.3 |
| 4,512,212 | 4/1985 | Ishikawa | 74/890 |
| 4,651,593 | 3/1987 | Aoki et al. | 74/890 |
| 4,660,697 | 4/1987 | Yoneda et al. | 74/890 X |
| 4,783,743 | 11/1988 | Yashiki et al. | 74/890 X |
| 4,930,608 | 6/1990 | Schenk et al. | 192/3.3 X |
| 4,967,355 | 10/1990 | Iwatsuki et al. | 74/866 X |
| 4,984,484 | 1/1991 | Fujiwara et al. | 74/866 |
| 5,035,308 | 7/1991 | Baba et al. | 192/3.3 X |

Primary Examiner—Rodney H. Bonck
Assistant Examiner—Daniel Wittels
Attorney, Agent, or Firm—Fleit, Jacobson, Cohn, Price, Holman & Stern

[57] ABSTRACT

A control system for an automatic transmission includes a torque converter having input and output members through which driving power is transmitted. A lock-up clutch is provided in the torque converter for connecting the input and output members without intervention of hydraulic fluid. A multiple stage transmission gear mechanism is connected with the output member of the torque converter and has a plurality of shift gear stages. A shift control device shifts the shift gear stage in accordance with a vehicle operating condition. An engaging force control device controls an engaging force of the lock-up clutch in a manner such that a slip rate of the lock-up clutch is changed. Finally, an acceleration judging device judges a required acceleration, and the engaging force control device reduces the engaging force as the required acceleration is increasd. The control is made in a manner such that the driving power transmitted through the automatic transmission is continuously changed in accordance with the required acceleration. Both acceleration performance and fuel consumption performance can be improved.

9 Claims, 5 Drawing Sheets

CONTROL SYSTEM FOR CONTINUOUSLY OPERATING TRANSMISSION ACCORDING TO REQUIRED ACCELERATION

BACKGROUND OF THE INVENTION

1. Field of the Invention

This invention relates to a control system for an automatic transmission having a lock-up clutch.

2. Description of Related Art

An automatic transmission system is generally provided with a torque converter and a multiple stage transmission gear mechanism connected with an output shaft of the torque converter. The automatic transmission system is further provided with a control device for controlling the multiple stage transmission gear mechanism to provide a proper shift gear stage among a plurality of shift gear stages thereof in accordance with a running condition of vehicle. The torque converter is provided with a lock-up clutch for connecting an input member with an output member without intervention of a hydraulic fluid. In a relatively high speed and stable running condition of the vehicle, the lock-up clutch is engaged to connect the input member with the output member of the torque converter directly so as to improve fuel consumption performance. The control device is provided, as shift mode patterns with an economy mode in which a shift operation is made at a relatively low speed of the vehicle and with a power mode in which the shift operation is made in a relatively high speed condition. The control device selects one of the shift mode patterns in light of the driver's taste. A slip control of the lock-up clutch has been also known wherein the lock-up clutch is controlled in a slip control zone to produce a certain slippage between the input and output members.

In an automatic transmission system disclosed by Japanese Publication No. 51-22698, published for opposition in 1976, when an acceleration requirement is detected, the shift mode is switched from the economy mode to the power mode to improve acceleration performance. Japanese Patent Public Disclosure No. 58-37368, laid open to the public in 1983, proposes that the lock-up clutch be disengaged to improve the acceleration performance in an accelerating condition of the vehicle.

It should, however, be noted that the conventional control system for the automatic transmission simply Provides a switching action on the shift mode and the lock-up. These controls are not responsive to the running condition of the vehicle.

SUMMARY OF THE INVENTION

It is, therefore, an object of the invention to provide an automatic transmission with an improved fuel consumption efficiency.

Another object of the invention is to provide a control system for the automatic transmission providing an improved acceleration performance of the vehicle.

A further object of the invention is to provide a lock-up control system of the automatic transmission responsive to the driver's request.

The above and other objects of the invention can be accomplished by a control system for an automatic transmission comprising a torque converter having input and output members through which a driving power is transmitted, a lock-up clutch provided in the torque converter for connecting the input and output members without intervention of hydraulic fluid, a multiple stage transmission gear mechanism connected with the output member of the torque converter and having a plurality of shift gear stages, shift control means for shifting the shift gear stage in accordance with a vehicle operating condition, engaging force control means for controlling an engaging force of the lock-up clutch in such a manner that a slip rate of the lock-up clutch is changed, acceleration judging means for judging a required acceleration, and engaging force control means reducing the engaging force as the required acceleration is increased.

Preferably, the shift control means is provided, as shift modes with an economy mode in which a shift operation is made in the transmission gear mechanism in a relatively low speed condition and a power mode in which the shift operation is made in the transmission gear mechanism in a relatively high speed condition. A first control means shifts the shift mode from the economy mode to the power mode when the required acceleration is judged as greater than a first predetermined value. A second control means reduces the engaging force of the lock-up clutch when the required acceleration is smaller than the first predetermined value but greater than a second predetermined value which is smaller than the first predetermined value. Furthermore, when the required acceleration is smaller than the second reference, a third control reduces the engaging force to increase the slip rate of the lock up clutch.

In a preferred embodiment, the first control means reduces the engaging force when the required acceleration is greater than the first predetermined value.

In this case, when the power mode is being selected for making the shift operation, the control means releases the lock-up clutch. When a middle level acceleration is required in a case which the economy mode is being used, the lock-up clutch is released to establish a torque converter condition. When a weak acceleration is determined to be required, the slip rate is gradually increase so that it is ultimately released, thereby establishing the torque converter condition.

According to the present invention, the control for the automatic transmission is changed in accordance with the required acceleration made by the driver. Basically, the control is made in such a manner that the driving power transmitted through the automatic transmission is continuously changed in accordance with the required acceleration. When a high acceleration is required, in a case in which the lock-up clutch is engaged, the torque converter condition is established as soon as possible by releasing the lock-up clutch so as to obtain sufficient driving power to produce the acceleration required. When the required acceleration is not so high, the driving power is controlled by maintaining the lock-up condition, so far as the driving power needed can be obtained.

When a strong acceleration is required, in a case in which the economy mode is selected and the lock-up condition is established, the shift mode pattern is switched to the power mode immediately and, at acceleration is not so strong, the lock-up clutch may not be fully released for controlling the driving power as far as the desired driving power can be transmitted. In other words, a slip condition, in which a certain slippage between the input member and the output member of the lock-up clutch is allowed, is established to adjust the driving power transmitted therethrough. When the desired driving power can not be obtained under the slip condition, the torque converter condition is established either under the economy mode or the power mode. According to the present invention, when strong acceleration is required, the shift mode pattern is switched from the economy mode to the power mode to provide the driver with a strong acceleration feeling. In this case, when the lock-up clutch is released, the acceleration performance can be further improved. When a relatively small acceleration is required, in a case in which lock-up clutch is engaged, the slip condition may be temporarily established as a transition phase from the lock-up condition to the converter condition to effectively suppress undesirable racing of the engine.

The above and other objects and features of the present invention will be apparent from the following description while taking reference to the accompanying drawings.

DESCRIPTION OF THE PREFERRED EMBODIMENT

Figure 1:
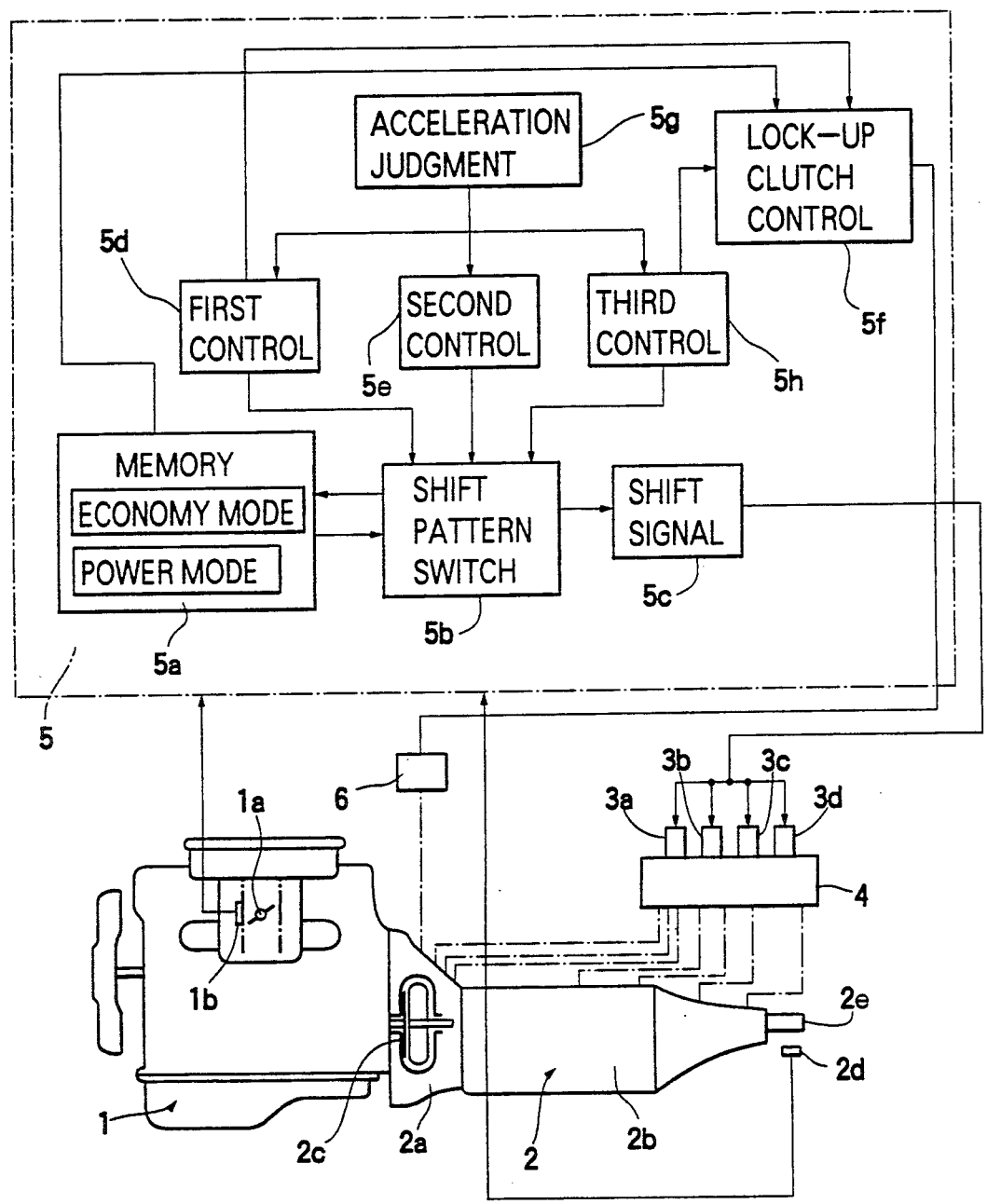
FIG. 1 is a schematic view of a control system of an automatic transmission in accordance with a preferred embodiments of the present invention.

Referring to FIG. 1, an illustrated automatic transmission 2 connected with an output shaft of the engine 1 and includes a torque converter 2a connected with the output shaft of the engine 1 and a multiple stage transmission gear mechanism connected with an output member of the torque converter and having a plurality of shift gear stages. The transmission is also provided with solenoid valves 3a, 3b, 3c and 3d which control a hydraulic pressure of the hydraulic circuit 4 to select one of the shift gear stages of the gear mechanism 2b. The torque converter 2a is provided with a lock-up clutch 2c which is disengaged when the hydraulic pressure is introduced into the Iock-up clutch 2c through a lock-up clutch control valve 6 and is engaged by . virtue of the hydraulic pressure within the torque converter 2a when the introduction of the hydraulic pressure is stopped. There is provided a controller 5 for supplying control signals for the solenoid valves 3a, 3b, 3c and 3d and the lock-up clutch control valve 6 so as to control the hydraulic circuit 4 and the lock-up clutch 2c.

The controller 5 receives signals from a throttle sensor 1b for detecting opening of a throttle valve la of the engine, a vehicle speed sensor 2d for detecting rotation speed of the output shaft 2e of the automatic transmission 2 and produces control signals in accordance with a vehicle operating condition. The controller 5 may include a micro computer. The controller 5 also includes a memory 5a in which a plurality of shift mode patterns are stored.

Figure 2A:
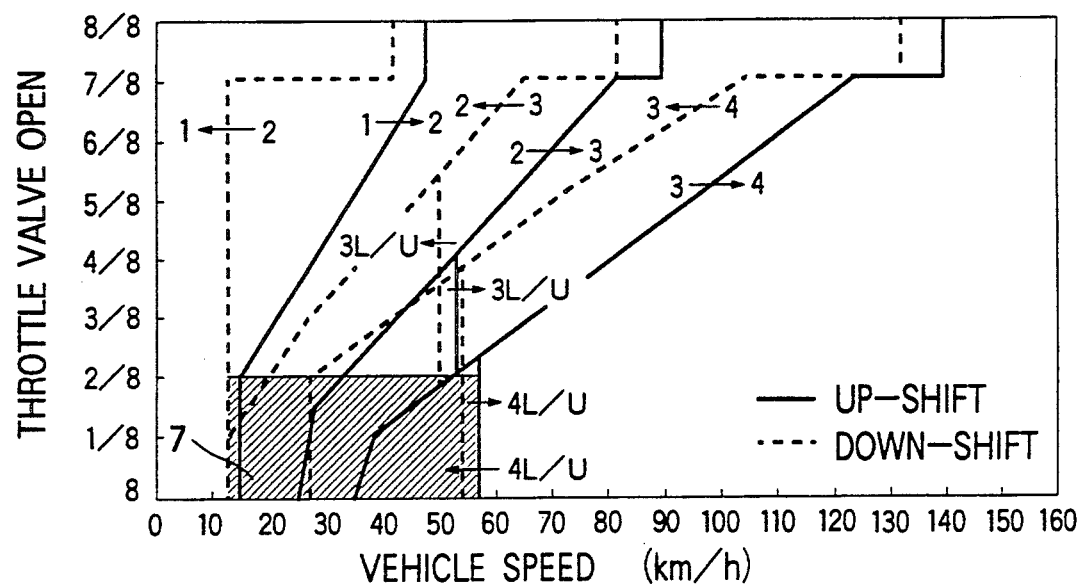
FIGS. 2a and 2b are graphical representations showing an economy mode (a) and a power mode (b) as shift mode patterns.
Figure 2B:
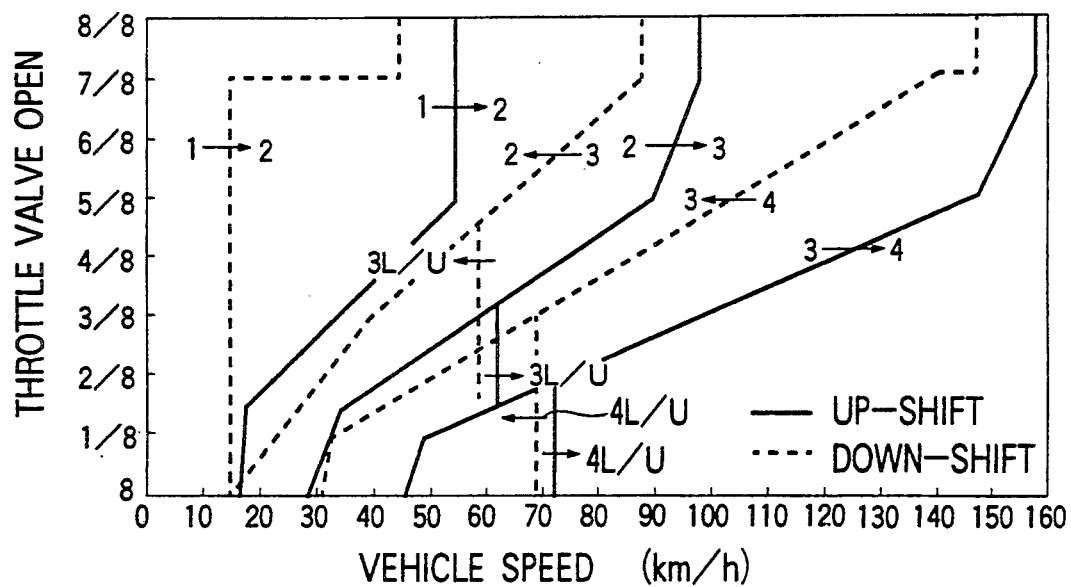

FIG. 2 shows the shift mode patterns by which a shift operation is made in the multiple stage transmission gear mechanism 2b. FIG. 2(a) shows an economy mode in which the shift operation is made in a relatively low vehicle speed. FIG. 2(b) shows a power mode in which the shift operation is made in a relatively high vehicle speed.

The controller 5 is provided with a switching device 5b for switching the shift mode pattern in the memory 5a in accordance with the vehicle operating condition. A shift signal producing device 5c produces a shift control signal and provides the solenoid valves 3a, 3b, 3c and 3d with the shift control signal. The switching device 5b normally reads out the economy mode and switches the economy mode to the power mode when a predetermined switching condition is detected. For this purpose, the controller 5 is provided with a first and second control devices 5d and 5e.

The controller 5 is further provided with a lock-up clutch control device 5f. The lock-up clutch control device 5f produce a lock-up signal for engaging the lock-up clutch 2c when a lock-up condition is detected in light of the shift mode pattern selected from the memory 5a. The lock-up signal is supplied for the lock-up clutch control valve 6 which produces the hydraulic pressure when the vehicle operating condition is not in the lock-up zone so that the lock-up clutch 2c is disengaged. When the lock-up condition is detected, the lock-up clutch control valve 6 stops supplying the hydraulic pressure so that the lock-up clutch 2c is urged to be engaged by virtue of the hydraulic pressure produced in within the torque converter 2a.

Furthermore, the controller 5 is provided with an acceleration judging device 5g for detecting accelerating condition of the vehicle. The acceleration judging device 5g obtains an opening speed of the throttle valve la based on the signal from the throttle sensor 1b to judge a required acceleration level.

When the opening speed of the throttle valve 1a is greater than a acceleration is required and Produces a high acceleration signal which is introduced into the first control device 5d. When the opening speed is not greater than the first predetermined value but is greater than a second predetermined value which is smaller than the first predetermined value, the judging device holds that a middle level acceleration is required and produces a middle acceleration signal which is introduced into the second control device 5e.

In the shift mode patterns shown in FIGS. 2(a), 2(b), there are shown plural shift control lines in the figures.

A shift control line having a rightward arrow indicates a shift-up control line. On the other hand, a shift control line having a leftward arrow indicates a shift-down control line. A line having L/U shows a lock-up control line. A lock-up control line having a rightward arrow indicates an engaging line for engaging the lock-up clutch. A lock-up control line having a leftward arrow indicates a disengaging line for disengaging the lock-up clutch 2c.

When the required strong acceleration is detected, in a case in which the lock-up condition is established under the economy mode as shown in FIG. 2(a), the first control device 5d provides the switching device 5b with a control signal to switch the shift mode pattern from the economy mode to the power mode. Concurrently, the lock-up clutch control device 5f, in the illustrated embodiment, receives a control signal to disengage the lock-up clutch 2c.

When the middle level acceleration requirement is detected in a case in which lock-up condition is established under the economy mode as shown in FIG. 2(a), the first control device 5d provides the lock-up clutch control device 5b with a control signal to cause the lock-up control valve 6 to disengage the lock-up clutch 2c without switching the shift mode pattern.

As shown in FIG. 2(a) and 2(b), there is provided a slip control zone 7 shown by hatching. In the slip control zone, the lock-up clutch 2c is maintained at a slip condition in which a certain slippage between input and output members is allowed. The slip condition can be obtained by controlling the hydraulic pressure produced in the control valve 6 for disengaging the lock-up clutch. A desirable slip rate, or, speed difference between the input and output member of the lock-up clutch 2c can be obtained through control of the hydraulic pressure. The controller 5 is provided with a third control device 5h which receives a control signal from the acceleration judging device 5g.

The acceleration judging device 5g provides the third control device 5h with a control signal when the opening speed is smaller than the second predetermined value or when a small acceleration is required in a case in which the lock-up condition or the slip condition is established. In this case, the lock-up clutch 2c is not disengaged immediately but controlled to the slip condition wherein the slip rate is gradually increased so as to accomplish the torque converter condition eventually. In this control, when a small acceleration requirement is detected in a case in which the vehicle is in the slip condition, the lock-up clutch control device 5f produces a control signal which increases the hydraulic pressure from the control valve 6 for disengaging the lock-up clutch 2c. As a result, the slip rate is gradually increased as the hydraulic pressure from the control valve 6 is increased.

When the controller 5 includes the micro computer, a control program can accomplish the same function as outlined above without providing specific devices. FIG. 1 includes functional blocks for accomplishing the desirable function when a micro computer is employed.

Figure 3A:
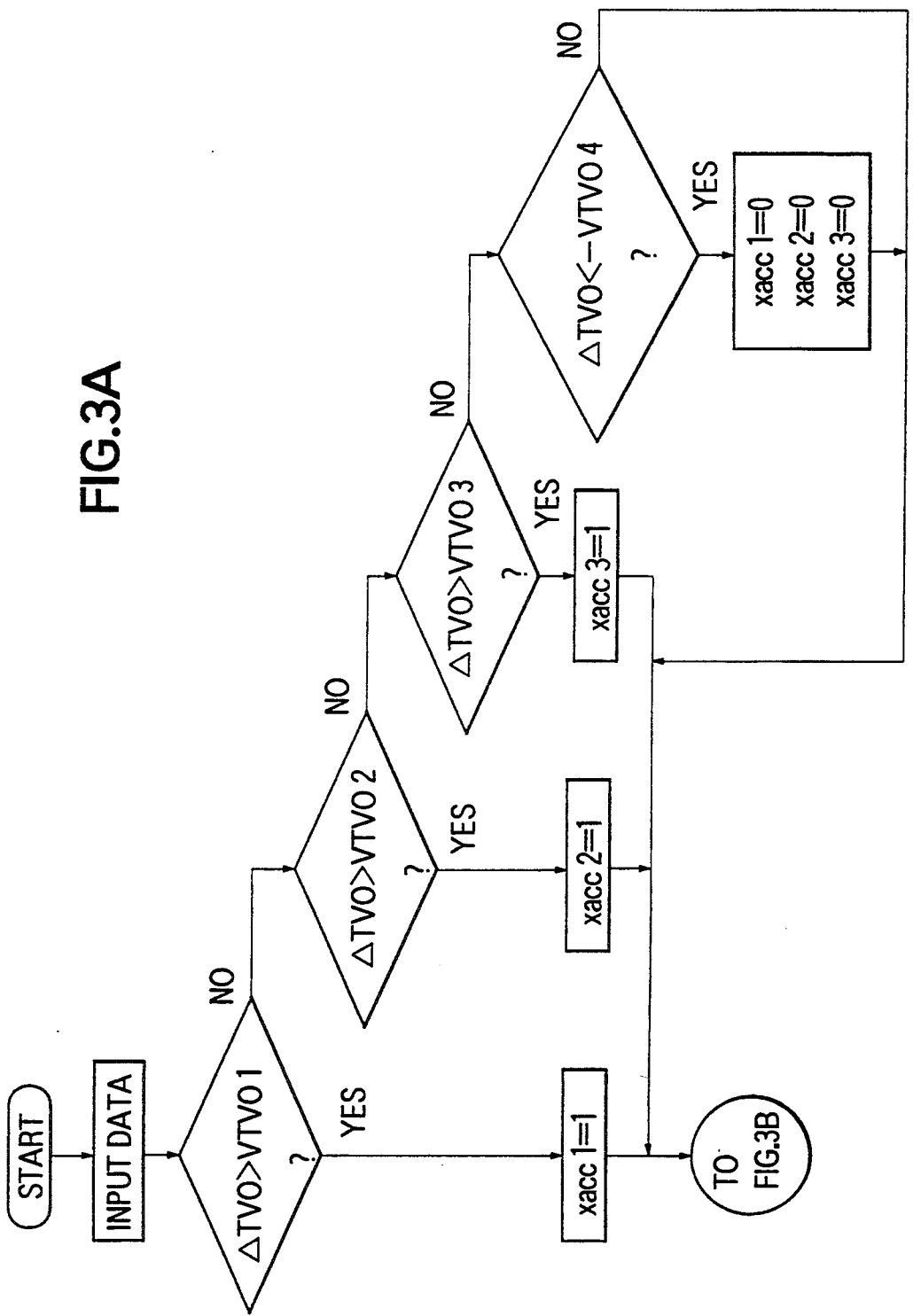
FIGS. 3(A) 3(B) and 3(C) are flow charts of a control program of the present invention.
Figure 3B:
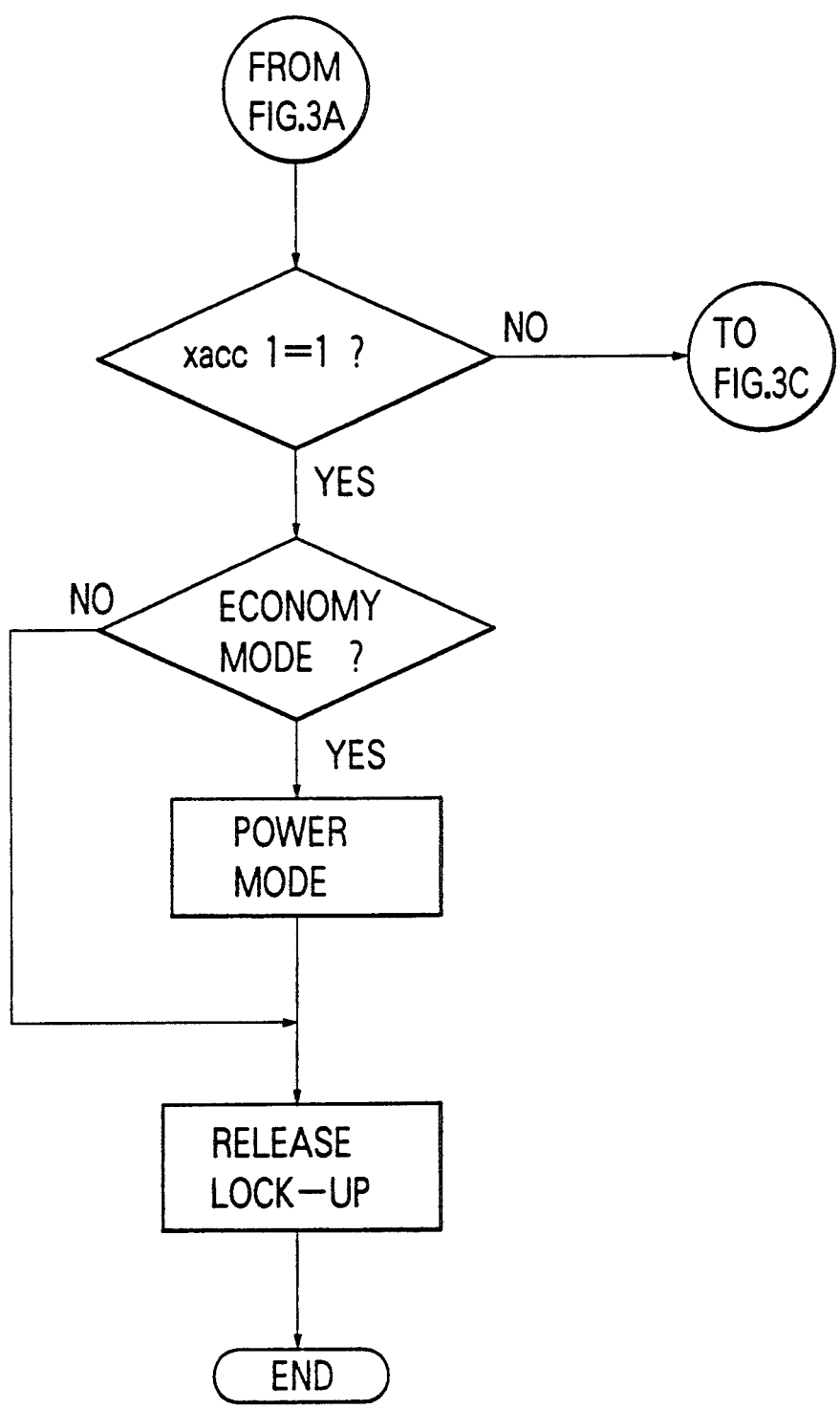
Figure 3C:
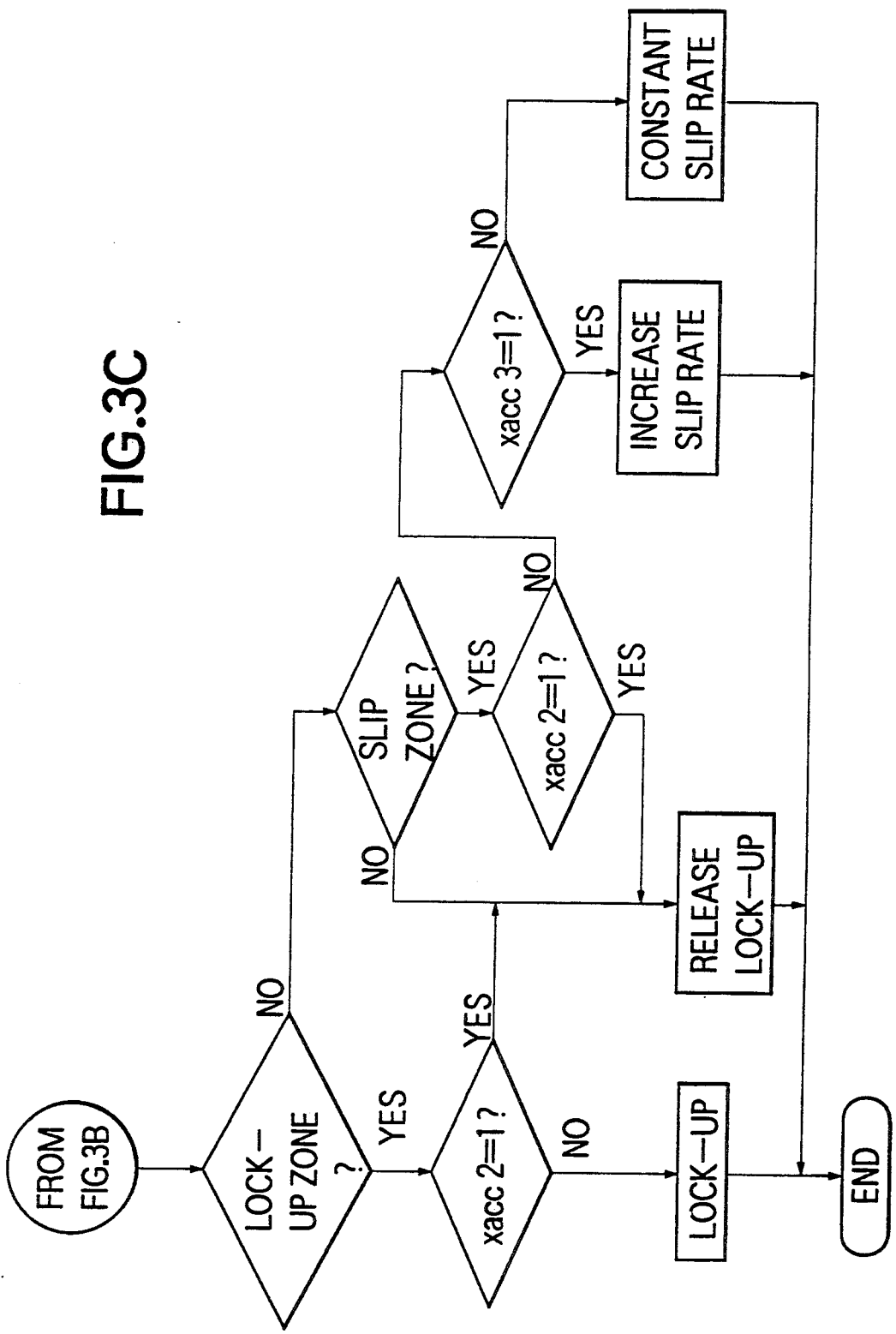

Referring to FIGS. 3A, 3B and 3C, control program charts, representing operations for carrying out a shift control in a case in which the micro computer is employed, are shown. The controller 5 reads input data or signals from the throttle sensor 1b for detecting an opening of the throttle valve 1a of the engine and the vehicle speed sensor 2d for detecting rotation speed of the output shaft 2e of the automatic transmission 2. Next, the controller 5 calculates the opening speed or change rate of the throttle valve 1a and compares the obtained opening speed or change rate $\Delta$ TVO with a first predetermined value VTVO1. When the change rate $\Delta$ TVO is greater than the first predetermined value VTVO1, the controller 5 sets a flag xacc1 at 1. When the change rate $\Delta$ TVO is not greater than the first predetermined value VTVO1, the controller 5 compares the change rate $\Delta$ TVO with a second predetermined value VTVO2 which is smaller than the first predetermined value VTVO1. When the change rate $\Delta$ TVO is greater than the second predetermined value VTVO2, the controller 5 sets a flag xacc2 at 1. When the change rate $\Delta$ TVO is not greater than the second predetermined value VTVO2, the controller 5 compares the change rate $\Delta$ TVO with a third predetermined value VTVO3 which is smaller than the second predetermined value VTVO2. When the change rate $\Delta$ TVO is greater than the third predetermined value VTVO3, the controller 5 sets a flag xacc3 at 1. When the change rate $\Delta$ TVO is not greater than the third predetermined value VTVO3, the controller 5 compares the change rate $\Delta$ TVO with a predetermined negative value $-$VTVO4. When the change rate $\Delta$ TVO is not greater than the negative value condition $-$VTV04, the controller 5 sets the flag xacc1, flag xacc2 and flag xacc3 at 0.

When the flag xacc1 is 1, the required acceleration is high. When the flag xacc2 is 1, the required acceleration is at a middle level. When the flag xacc3 is 1, the required acceleration is low. When all the flags xacc1, xacc2 and xacc3 are zero, there is no acceleration requirement.

Next, the controller 5 reads the value of the flag xacc1. When the value of the flag xacc1 is 1, the controller 5 judges whether or not the shift mode pattern is the economy mode. When the economy mode is selected, the controller 5 switches the shift mode pattern from the economy mode to the power mode since the required acceleration is high. Concurrently, the controller disengages the lock-up clutch 2c when engaged. When the flag xacc1 is 0, the controller 5 judges whether or not the vehicle is in the lock-up zone. When the vehicle is in the lock-up zone, the controller 5 judges thereafter whether or not the flag xacc2 is 1. When the flag xacc2 is 0, the controller 5 engages the lock-up clutch 2c. When the flag xacc2 is 1, the controller 5 disengages the lock-up clutch 2c. In this case, when the vehicle is not in the lock-up zone, the controller 5 judges whether or not the vehicle is in the slip zone. When the vehicle is not in the slip zone, the lock-up clutch 2c is disengaged. When the vehicle is in the slip zone, the controller 5 judges whether or not the flag xacc2 is 1. When the flag xacc2 is 1, the lock-up clutch 2c is disengaged. When the flag xacc2 is 0, the controller 5 judges whether or not the flag xacc3 is 1. When the flag xacc3 is 1, the controller 5 increases the slip rate by a certain increment. On the other hand, when the flag xacc3 is 0 the slip rate is not changed. The slip rate may be increased when the required acceleration is middle level or when the flag xacc1 is 1 in a case in which the vehicle is in the lock-up zone. In the illustrated embodiment, the high and middle level acceleration causes the lock-up clutch 2c to be disengaged. In a modified embodiment, the lock-up zone and the sip zone can be changed in accordance with the required acceleration by switching the shift mode pattern so that a different condition can be obtained among the torque converter condition, the slip condition, and the lock-up condition, even where the same throttle valve opening and vehicle speed are provided. The lock-up zone and the slip zone may be changed in accordance with the required acceleration in a single shift mode pattern.

In the slip condition, the slip rate can be controlled to reach a target value to change the engaging force of the lock-up clutch continuously.

According to the present invention, the lock-up clutch is kept engaged as far as the required acceleration is satisfied so that an improved fuel consumption efficiency can be obtained. When strong acceleration is required, the shift mode is switched from the economy mode to the power mode to respond the acceleration requirement.

It should be noted that although the present invention is described in connection with a specific embodiment, making reference to the accompanying drawings, many modifications can be made by the those skilled in the art, based on the foregoing, and all of the modifications which fall within the scope of the present invention are intended to be covered by by the attached claims.

What is claimed is:

1. A control system for an automatic transmission connected to an engine having a throttle valve comprising:
    a torque converter having input and output members through which driving power is transmitted,
    a lock-up clutch provided in the torque converter for connecting the input and output members without intervention of a hydraulic fluid,
    a multiple stage transmission gear mechanism connected with the output member of the torque converter and having a plurality of shift gear stages,
    shift control means for shifting the shift gear stage in accordance with a vehicle operating condition,
    engaging force control means for controlling an engaging force of the lock-up clutch in a manner such that a slip rate of the lock-up clutch is changed, and
    acceleration judging means for judging a required acceleration based on an opening speed of the throttle valve, the engaging force control means controlling the engaging force in accordance with the required acceleration and reducing the engaging force of the lock-up clutch as the required acceleration is increased.

2. A control system as recited in claim 1 further comprising switching means for switching a shift mode pattern between an economy mode in which shift operation is made in the transmission gear mechanism in a relatively low speed condition and a power mode in which the shift operation is made in the transmission gear mechanism in a a relatively high speed condition, the switching means switching the shift mode pattern to the power mode when the required acceleration is high.

3. A control system as recited in claim 1 wherein when a weak acceleration is required, the slip rate is gradually increased so that the lock-up clutch is disengaged for thereby establishing a torque converter condition eventually.

4. A control system as recited in claim 1 wherein the required acceleration is detected based on opening speed of a throttle valve.

5. A control system for an automatic transmission comprising:
    a torque converter having input and output members through which driving power is transmitted,
    a lock-up clutch provided in the torque converter for connecting the input and output members without intervention of a hydraulic fluid,
    a multiple stage transmission gear mechanism connected with the output member of the torque converter and having a plurality of shift gear stages,
    shift control means for shifting the shift gear stage in accordance with a vehicle operating condition,
    engaging force control means for controlling an engaging force of the lock-up clutch in a manner such that a slip rate of the lock-up clutch is changed,
    acceleration judging means for judging a required acceleration, the engaging force control means reducing the engaging force of the lock-up clutch as the required acceleration is increased, and
    switching means for switching a shift mode pattern between an economy mode in which a shift operation is made in the transmission gear mechanism in a relatively low speed condition and a power mode in which the shift operation is made in the transmission gear mechanism in a relatively high speed condition, the switching means switching the shift mode pattern to the power mode when the required acceleration is high, wherein the engaging force control means disengages the lock-up clutch concurrently with a switch of the shift mode pattern when the required acceleration is high and the lock-up clutch is engaged.

6. A control system for an automatic transmission comprising:
    a torque converter having input and output members through which driving power is transmitted,
    a lock-up clutch provided in the torque converter for connecting the input and output members without intervention of a hydraulic fluid,
    a multiple stage transmission gear mechanism connected with the output member of the torque converted and having a plurality of shift gear stages,
    shift control means for shifting the shift gear stage in accordance with a vehicle operation condition,
    engaging force control means for controlling an engaging force of the lock-up clutch in a manner such that a slip rate of the lock-up clutch is changed,
    acceleration judging means for judging a required acceleration, the engaging force control means reducing the engaging force of the lock-up clutch as the required acceleration is increased, and
    switching means for switching a shift mode pattern between an economy mode in which a shift operation is made in the transmission gear mechanism in a relatively low speed condition and a power mode in which the shift operation is made in the transmission gear mechanism in a relatively high speed condition, the switching means switching the shift mode pattern to the power mode when the required acceleration is high, wherein when a middle level acceleration is required in a case in which the economy mode is being used, the lock-up clutch is disengaged to establish a torque converter condition without switching the shift pattern.

7. A control system for an automatic transmission comprising
    a torque converter having an input and output members through which a driving power is transmitted,
    a lock-up clutch provided in the torque converter for connecting the input and output member without intervening a hydraulic fluid,
    a multiple stage transmission gear mechanism connected with the output member of the torque converter and having a plurality of shift gear stages,
    shift control mans for shifting the shift gear stage in accordance with a vehicle operation condition,
    the shift control means using a shift mode pattern between an economy mode in which a shift operation is made in a relatively low vehicle speed and a power mode in which the shift operation is made in a relatively high vehicle speed condition,
    acceleration judging means for judging a required acceleration, selecting the power mode when the required acceleration is judged as greater than a predetermined value, and
    second control means provided in the shift control means for reducing the engaging force of the lock-up clutch when the required acceleration is not greater than the first predetermined value but greater than a second predetermined value smaller than the first predetermined value.

8. A control system as recited in claim 7 further comprising means for reducing engaging force of the lock-up clutch when the required acceleration is greater than the first predetermined value.

9. A control system as recited in claim 7 wherein the shift control means comprises a third control means for gradually increasing a slip rate of the lock-up clutch to reduce engaging force of the lock-up clutch when the required acceleration is not greater than the second predetermined value in the case where the lock-up clutch is engaged.

* * * * *